United States Patent
Collins et al.

(10) Patent No.: US 8,360,320 B2
(45) Date of Patent: Jan. 29, 2013

(54) APPARATUS, SYSTEM AND METHOD FOR A HYBRID OPTICAL CODE SCANNER

(75) Inventors: Donald A. Collins, Buford, GA (US); James Morrison, Suwanee, GA (US)

(73) Assignee: NCR Corporation, Duluth, GA (US)

( * ) Notice: Subject to any disclaimer, the term of this patent is extended or adjusted under 35 U.S.C. 154(b) by 0 days.

(21) Appl. No.: 13/164,912

(22) Filed: Jun. 21, 2011

(65) Prior Publication Data

US 2012/0325913 A1    Dec. 27, 2012

(51) Int. Cl.
*G06K 7/10* (2006.01)
*G06K 9/22* (2006.01)
*A63F 9/02* (2006.01)

(52) U.S. Cl. ......... 235/462.43; 235/462.45; 235/462.14; 235/383; 186/59

(58) Field of Classification Search .................. 235/383, 235/462.14, 462.43, 462.45; 186/52, 59–68
See application file for complete search history.

(56) References Cited

U.S. PATENT DOCUMENTS

| 5,132,523 | A | * | 7/1992 | Bassett | 235/462.45 |
| 5,214,270 | A | * | 5/1993 | Rando | 235/462.36 |
| 5,314,631 | A | * | 5/1994 | Katoh et al. | 235/462.4 |
| 5,315,097 | A | * | 5/1994 | Collins et al. | 235/462.25 |
| 6,325,290 | B1 | * | 12/2001 | Walter et al. | 235/472.01 |
| 7,341,185 | B1 | * | 3/2008 | Arrington et al. | 235/383 |
| 7,546,953 | B1 | * | 6/2009 | Collins, Jr. | 235/462.43 |

* cited by examiner

*Primary Examiner* — Jamara Franklin
(74) *Attorney, Agent, or Firm* — Harden E. Stevens, III; Kevin P. Belote (57) ABSTRACT

An apparatus, system and method are presented for scanning items presented to an assisted hybrid optical code scanner where the scanner includes a handheld imaging scanner located on the customer side of the hybrid scanner. When docked with the hybrid scanner, the handheld imaging scanner is used with a fixed laser scanner to read optical codes. When undocked, the handheld imaging scanner is used to scan items not easily presentable to the hybrid scanner.

19 Claims, 6 Drawing Sheets

APPARATUS, SYSTEM AND METHOD FOR A HYBRID OPTICAL CODE SCANNER

FIELD OF THE INVENTION

The present invention relates generally to a hybrid optical code scanner. More particularly, but not exclusively, the invention relates to an apparatus, system, and method for scanning one or more items with a hybrid optical code scanner that includes a handheld imaging scanner located on the customer facing side of the hybrid optical code scanner.

BACKGROUND

Any discussion of the prior art throughout the specification should in no way be considered as an admission that such prior art is widely known or forms part of common general knowledge in the field.

Point of sale (POS) terminals are commonly used throughout the retail industry to process purchase transactions. A POS terminal typically includes a personal computer (PC) core and chassis, one or more displays, a fixed optical code scanner and weigh scale, a cash drawer, a magnetic stripe reader (MSR), keyboard and a printer. An assisted POS terminal has an operator that is trained to use the POS terminal and to process purchase transactions using the POS terminal.

In a typical purchase transaction, where an assisted POS terminal is used, a customer brings one or more items for purchase to the POS terminal and the operator presents each item to POS terminal, which scans and identifies the item. Some items are too large or heavy or inconvenient (non-presentable items) to be physically presented to the fixed optical code scanner for identification. For these types of items, some POS terminals have a second portable handheld optical code scanner. When the operator identifies a non-presentable item, the operator will physically take the handheld optical code scanner to the location of the item and manual scan the optical code on the item for identification. This process has several limitations. It is time consuming since the operator must move from the operator side of the POS terminal to the customer side in order to gain access to the item. Once the item is scanned, the operator must then return back to the operator side to continue the purchase transaction. In addition, since the handheld optical code scanner is mainly used to scan non-presentable items, it has limited functionally and a low duty cycle.

Therefore, there is a need for a hybrid optical code scanner that provides a more efficient use of a handheld optical code scanner.

SUMMARY OF THE INVENTION

It is an object of the present invention to overcome or ameliorate at least one of the identified limitations, or to provide a useful alternative.

Among its several aspects, the present invention recognizes a condition in an assisted POS terminal where a handheld imaging optical code scanner has a low duty cycle and is positioned in a location that is conveniently accessible only to a trained operator of the POS terminal.

In accordance with an aspect of the present invention, there is provided a handheld imaging optical code scanner positioned for convenient access by a customer using an assisted checkout POS terminal.

In accordance with another aspect of the present invention, there is provided a hybrid optical code scanner that is part of an assisted checkout POS terminal. The hybrid optical code scanner includes a fixed laser scanner integrated with a dockable handheld imaging scanner where the handheld imaging scanner scans full time when docked with the hybrid optical code scanner.

In accordance with another aspect of the present invention, the handheld imaging scanner is located on the customer facing side of the hybrid optical code scanner.

In accordance with another aspect of the present invention, the hybrid optical code scanner includes an optical assembly that directs images to the handheld imaging scanner, when it is docked. The optical assembly includes a mirror movable between two positions where a first position directs images received from an operator facing side and a second position directs images received from a customer facing side of the hybrid optical code scanner to the handheld imaging scanner.

In a preferred embodiment, there is provided an assisted hybrid bar code scanner where a handheld imaging scanner reads bar codes presented to the hybrid bar code scanner when the handheld imaging scanner is not being used by a customer to read bar codes not presented directly to the hybrid bar code scanner, the hybrid bar code scanner comprising:

a handheld imaging bar code scanner comprising an image capture device where the image capture device receives images from a first image path; and a fixed laser bar code scanner in communication with the handheld scanner, the fixed scanner including:

a operator facing scanning window through which a laser beam is directed to read bar codes presented to the hybrid bar code scanner for reading;

a customer facing window;

a cradle located on the customer facing side of the hybrid bar code scanner for lockably mounting the handheld scanner in a predetermined orientation; and an optical assembly configurable between a first and a second position where the assembly when in the first position receives a first image from a predetermined second image path that extends through the operator facing scanning window and directs the first image to the handheld scanner along the first image path and when the assembly is in the second position receives a second image from a predetermined third path that extends through the customer facing window and directs the second image to the handheld scanner along the first image path.

A more complete understanding of the present invention, as well as further features and advantages of the invention, will be apparent from the following Detailed Description and the accompanying Drawings.

BRIEF DESCRIPTION OF THE DRAWINGS

The aspects of the claimed invention can be better understood with reference to the drawings and the detailed description. The drawings are not necessarily drawn to scale. Throughout the drawings, like element numbers are used to describe the same parts throughout the various drawing figures and charts.

DETAILED DESCRIPTION

In the following description, numerous details are set forth to provide an understanding of the claimed invention. However, it will be understood by those skilled in the art that the claimed invention may be practiced without these details and that numerous variations or modifications from the described embodiments are possible.

The claimed invention is described in combination with a POS terminal. However, other embodiments are envisioned where the invention is a stand-alone hybrid optical code scanner or combined with other devices that require reading optical codes. As used herein, optical codes include optical machine-readable representations of data and optical human-readable symbols. Optical codes include but are not limited to symbols, text and bar codes. Furthermore, bar codes include but are not limited to one-dimensional and two-dimensional bar codes.

Figure 1:
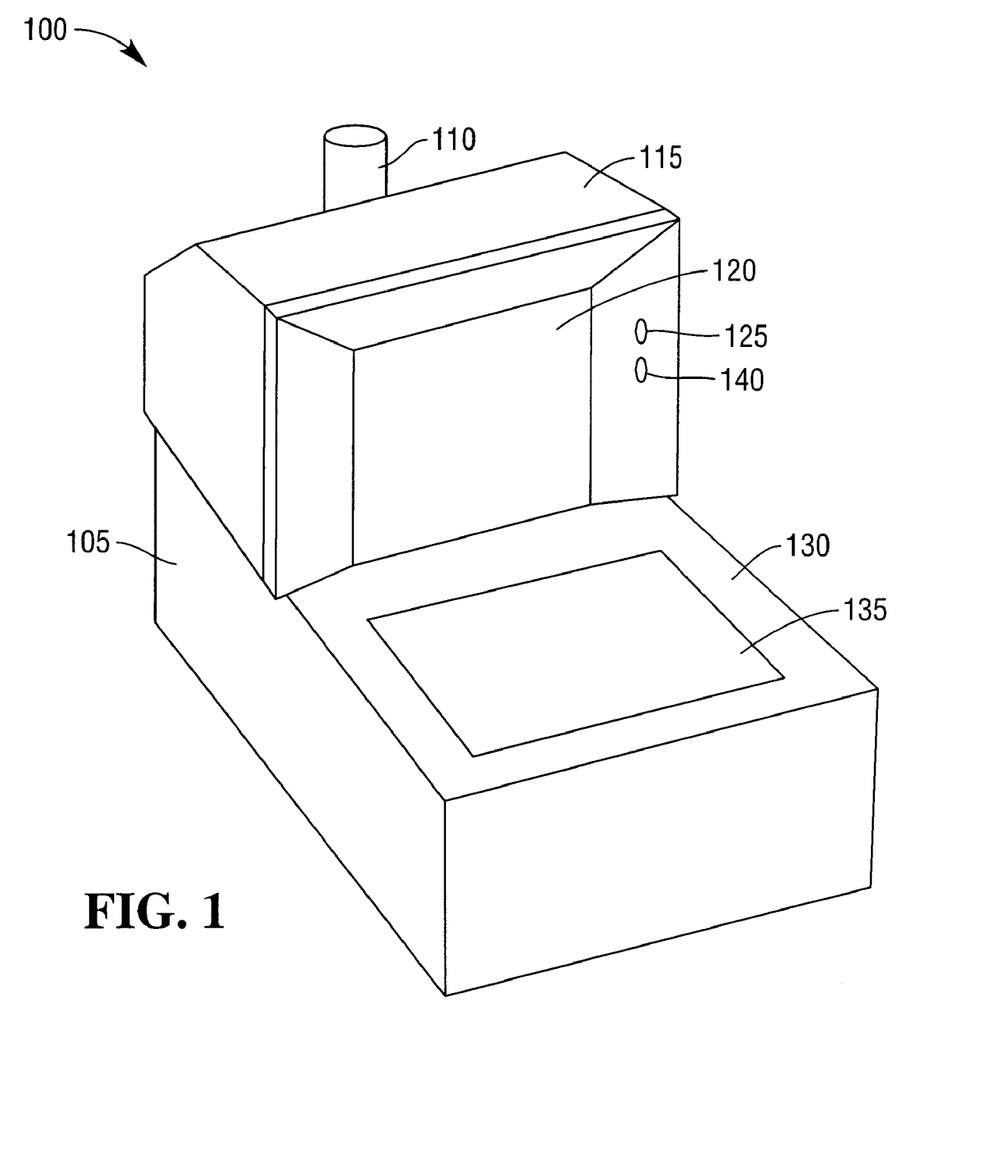
FIG. 1 is a high-level drawing illustrating an exemplar embodiment of a hybrid scanner.

Referring now to FIG. 1, there is provided a high-level drawing illustrating an exemplar embodiment of a hybrid optical code scanner 100 (hybrid scanner). A hybrid scanner uses a combination of two different types of scanning technology to read optical codes presented to the hybrid scanner. In the present invention, the hybrid scanner 100 uses scanning technologies based on a laser and on imaging.

The hybrid scanner 100 includes a laser based bi-optic scanner 105 and an imaging based handheld scanner 110. The bi-optic scanner 105 includes a horizontal scanning window 135 and vertical scanning window 120. The horizontal scanning window 135 is housed in a horizontal housing component 130 of the bi-optic scanner 105. The vertical scanning window 120 is housed in a vertical housing component 115 of the bi-optic scanner 105. The side of the vertical housing component 115 that houses the vertical scanning window 120 is known as the front and faces the operator of the hybrid scanner 100. The horizontal scanning window 135 also faces the operator.

The bi-optic scanner 105 directs one or more laser beams through the vertical scanning window 120 and the horizontal scanning window 135. When a directed laser beam strikes an object presented to the hybrid scanner 100, the object reflects a portion of the laser light. Some of the reflected laser light passes back through one of the scanning windows (120 or 135) and is directed to a photo detector that produces electrical signal data proportional to the amount of light received. The data is processed to detect the presence of an optical code and to recover the information associated with the optical code.

The handheld scanner 110 includes an image capture device. Images captured by the image capture device are processed and optical codes within the images are detected and information associated with each optical code is recovered. The handheld scanner 110 is portable and can be moved to an area where an optical code is located rather having to move the optical code to a scanner. This especially helpful when objects for scanning are heavy, large, fragile or it inconvenient to present the object. The handheld scanner 110 is also used to capture images of documents or people. The types of documents include forms of identification and coupons.

The bi-optic scanner 105 includes operator input devices in the form of two buttons (125, 140).

In other embodiments, the hybrid scanner 100 uses a single window laser scanner instead of a bi-optic laser scanner 105. In some embodiments, a weigh scale is included in the horizontal portion 130 of the scanner.

Figure 2:
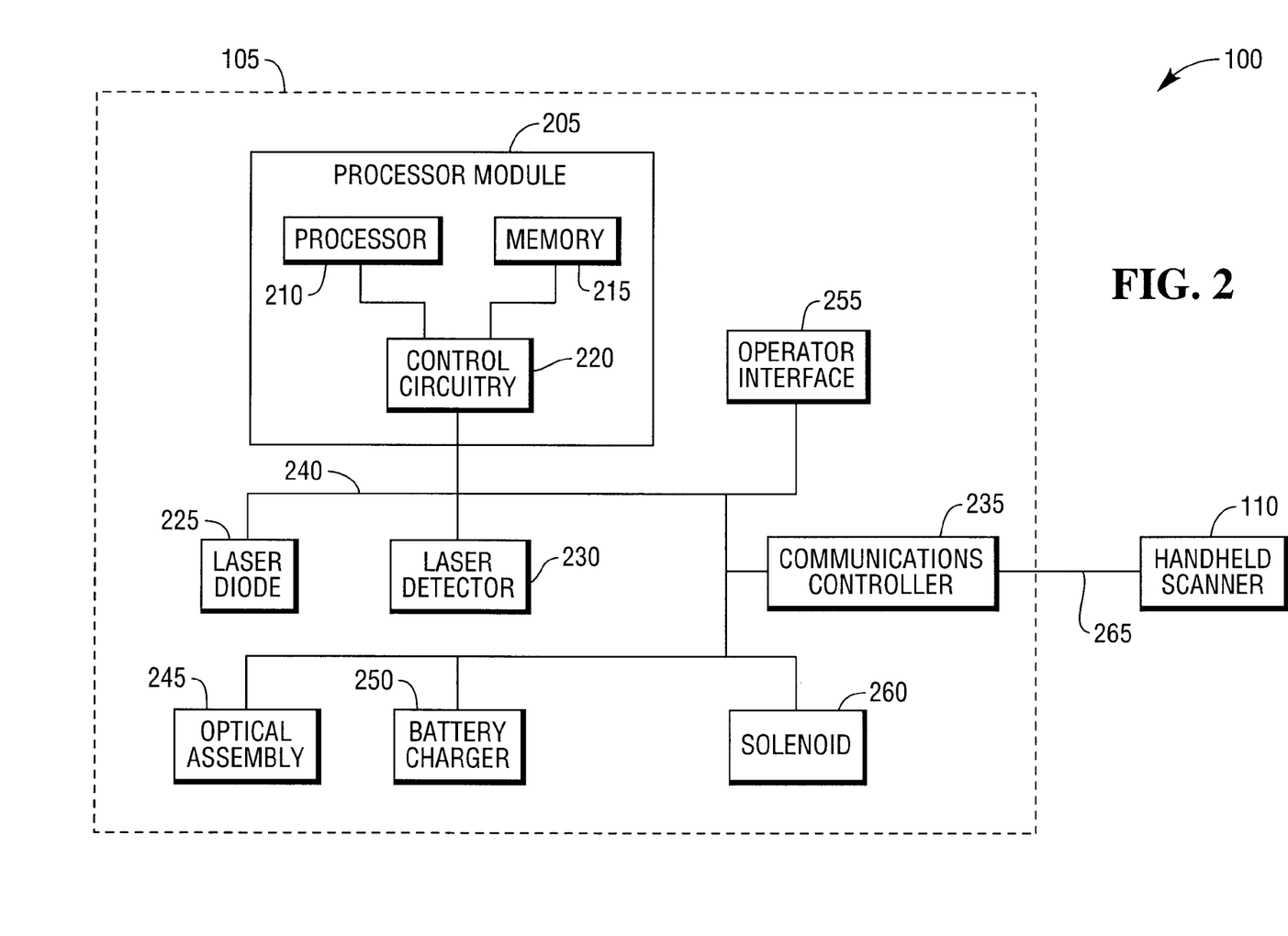
FIG. 2 is a high-level block diagram illustrating an exemplar embodiment of a hybrid scanner.

FIG. 2 provides a high-level block diagram illustrating an exemplar embodiment of the hybrid scanner 100. The hybrid scanner 100 includes the bi-optic scanner 105 and the handheld imaging scanner 110. The bi-optic scanner 105 includes a processor module 205 which includes a processor 210, a memory 215 and control circuitry 220. The memory 215 includes both volatile and non-volatile memory. The processor 210 executes software stored in the memory 215 which causes the processor 210 to control the elements of the hybrid scanner 100 to implement the features and functions of the hybrid scanner 100.

The software stored in the memory 215 is transferred to the memory 215 from a non-transitory computer readable storage medium. Many different types of storage mediums can be used to store the software. In some embodiments, the storage medium is part of or attached to a fixed computer such as a computer server or a portable computing device such as a laptop computer, a pad device, or a smart phone. The types of storage mediums include rotating magnetic disks, rotating optical disks, solid state drives, and solid state memory devices. Solid state memory devices are based on solid state memory devices that retain stored data when power is removed. Solid state memory devices include memory sticks, flash drives, and SD cards. The software is transferred from a storage medium to the memory 215 over any of many different types of computer buses and digital networks. For example, a USB memory stick can be connected to a USB port and the software transferred over the USB bus to the memory 215. In another example, software stored in a smart phone is transferred to the memory 215 over a Bluetooth (or other wireless) network when the smart phone is located near the bi-optic scanner 105. In another example, software is stored on a disk drive attached to a computer server and is transferred over a network (e.g., the Internet and an intranet or combination of the two) to the memory 215. The network can be either a wired network or a wireless network or combination of both.

The control circuitry 220 includes hardware interfaces between the processor 210 and the memory 215 and between the processor 210 and a bus 240 used to communicate with other elements of the hybrid scanner 100. The bi-optic scanner 105 further includes a laser diode 225, a laser detector 230, an operator interface 255, a communications controller 235, an optical assembly 245, a battery charger 250 and a solenoid 260.

The laser diode 225 generates a laser beam that is, at different times, directed through the vertical scanner window 120 and the horizontal scanner window 135 to read optical codes presented to the bi-optic scanner 105. Laser light reflected from optical codes presented to the bi-optic scanner 105 is directed to the laser detector 230. The laser detector 230 is a photo detector that converts received light to electrical signals.

The optical assembly 245 includes a mirror (FIG. 3A, 305) that directs images to the handheld scanner 110 from a plurality of directions. Each direction defines an image path. The processor 210 controls the optical assembly 245 and determines which and when to direct an image path at the handheld scanner 110.

The battery charger 250 charges a battery in the handheld scanner 110 when it is docked with the bi-optic scanner 105. In some embodiments, the battery charger 250 provides status, readable by the processor 210, which indicates the handheld scanner 110 is docked to the bi-optic scanner 105.

The solenoid 260 is used to lock the handheld scanner 110 in place when it is docked with the bi-optic scanner 105. Locking the handheld scanner 110 in place prevents the unauthorized removal of the handheld scanner 110. In some embodiments, the solenoid 260 detects when the solenoid 260 has properly locked handheld scanner 110 in place.

The communications controller 235 includes a wireless communications device that communicates over the network 265 with the handheld scanner 110. The communications controller 235 also communicates with a point of sale terminal (not shown) over a different network. In some embodiments, the communications controller 235 includes a wired communications device that communicates over a wire to the handheld scanner 110. In some embodiments, the communications controller 235 supports a USB controller (not shown) that provides a method of communicating with the point of sale terminal and other peripherals.

The operator interface 255 includes a speaker that produces audible sounds associated with different functions to communicate with an operator. The operator interface 255 also receives input from the operator input devices which includes the first button 125 and the second button 140. A notice is sent to the processor 210 whenever either button (125, 140) is activated.

Figure 3A:
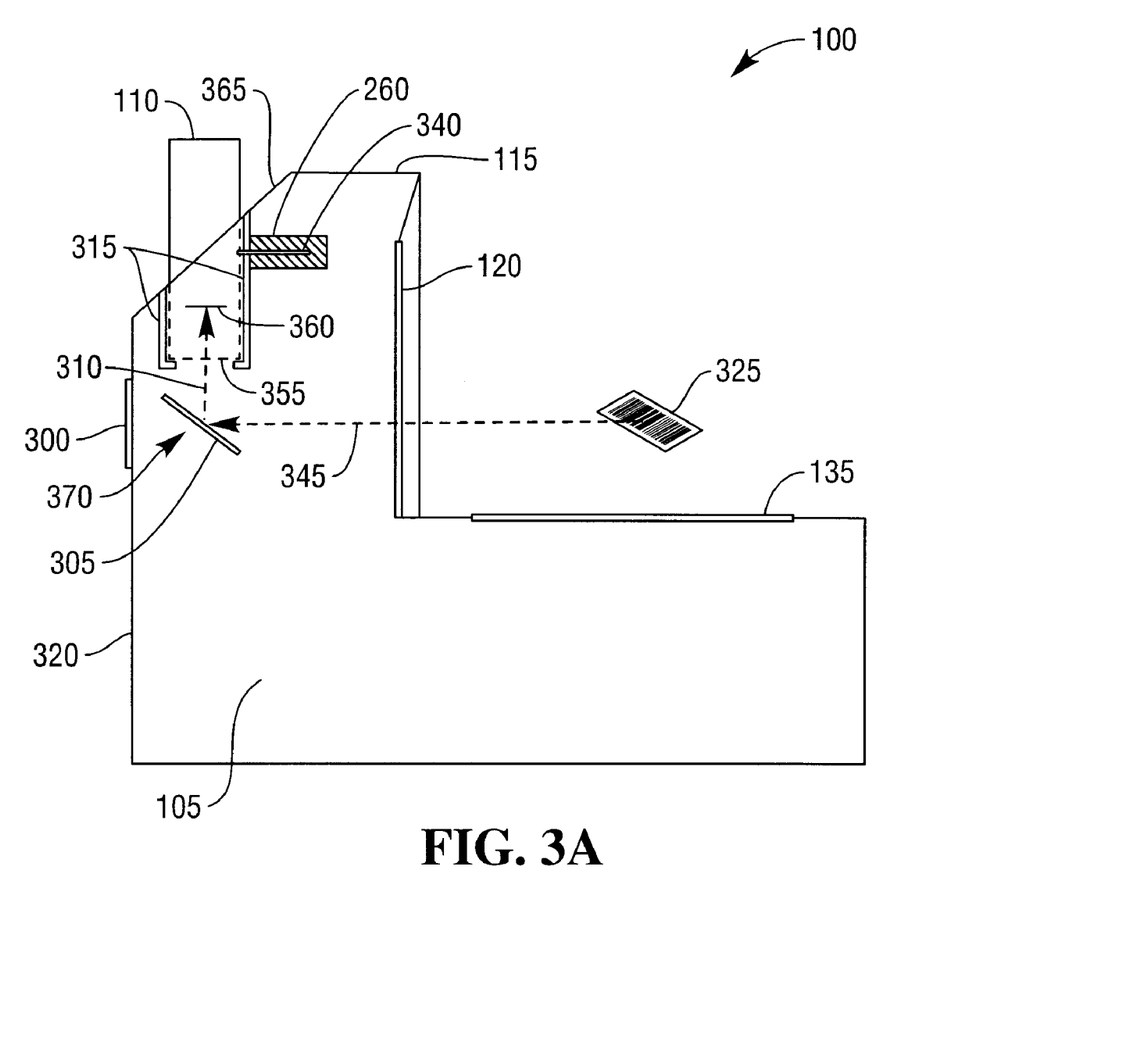
FIG. 3A is a cross-sectional drawing illustrating an exemplar embodiment of a hybrid scanner.

Turning to FIG. 3A, there is provided a cross-sectional drawing illustrating an exemplar embodiment of the hybrid scanner 100. The handheld scanner 110 is docked in a cradle 315, which is part of the vertical housing component 115. The cradle 315 is located on a customer facing side of the hybrid scanner 100. A customer facing side includes surfaces or portions of surfaces of the hybrid scanner 100 that may not directly face a customer but are located closer to the customer side than the operator side of the hybrid scanner 100.

In some embodiments, the design of the handheld scanner 110 and the cradle 315 will only permit the insertion of the handheld scanner 110 into the cradle 315 when the handheld scanner 110 is properly aligned with the cradle 315. That is, only one orientation of the handheld scanner 110 to the cradle 315 that will result in proper alignment and docking of the handheld scanner 110.

The handheld scanner 110 includes a window 355. Images pass through the window 355 and are focused onto the image capture device 360 where they are captured. When the handheld scanner 110 is docked in the cradle 315, the optical assembly 245 positions the mirror 305 to direct images along a first image path 310 through the window 355 to the image capture device 360. The mirror 305 is movable between at least two positions. When the mirror 305 of the optical assembly 245 is in a first position 370 (as shown in FIG. 3A), it receives images along a second image path 345 that extends from the mirror 305 through the vertical scanning window 120 to area above the horizontal scanning window 135. In this example, a bar code 325 is located in this area and an image of the bar code 325 is directed back to the handheld scanner 110 for capture, processing and decoding of the bar code 325.

The hybrid scanner 100 has a customer side that includes a first side 320 and a second side 365. These sides generally face the customer and are located closer to the customer than the operator. The first side 320 includes a customer facing window 300.

The solenoid 260 also includes a pin 340 that is extended into the handheld scanner 110 to lock in place in the cradle 315. The solenoid 260 is controlled by the processor 210 and can be commanded to extend the pin 340 to lock or retract the pin 340 to unlock the handheld scanner 110. In some embodiments, the handheld scanner 110 is locked in place using other methods such as an electro-magnet.

Figure 3B:
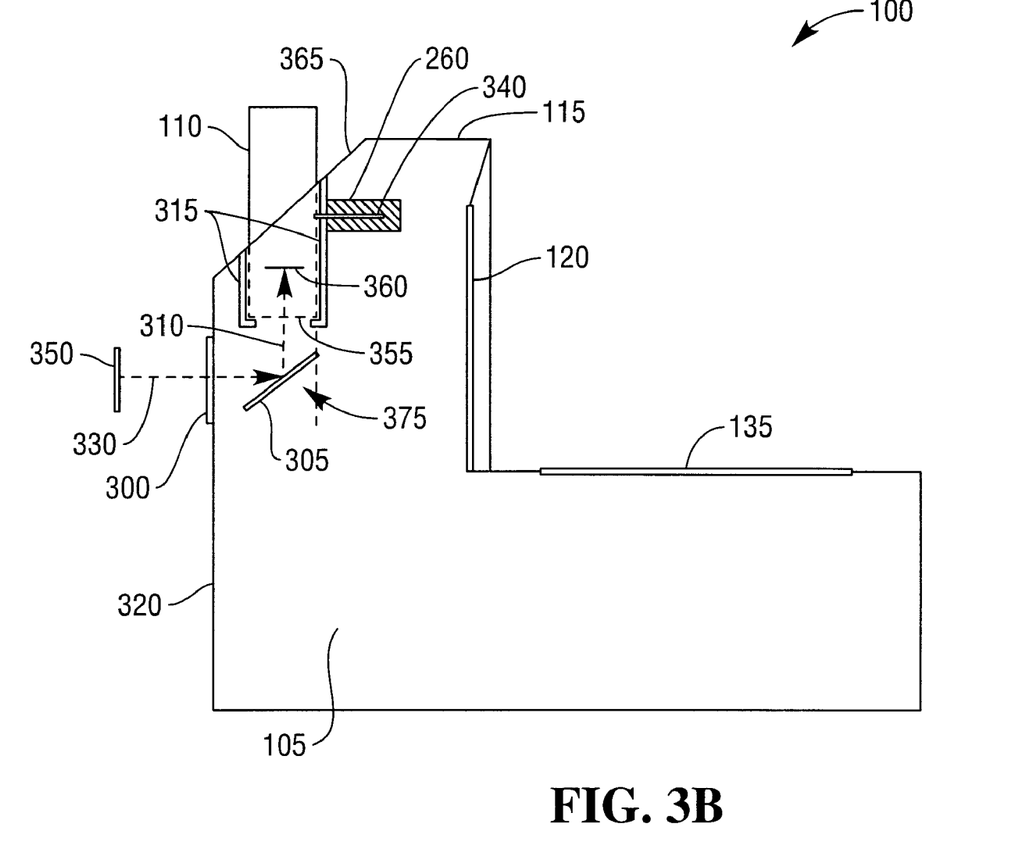
FIG. 3B is cross-sectional drawing further illustrating the exemplar embodiment of the hybrid scanner 100 depicted in FIG. 3A.

FIG. 3B is cross-sectional drawing further illustrating the exemplar embodiment of the hybrid scanner 100 depicted in FIG. 3A. In this drawing, the optical assembly 245 is configured so that the mirror 305 is in a second position 375 (as shown in FIG. 3B) where it receives images along a third image path 330 which extends from the mirror 305 through the customer facing window 300 to an area 350 where items are presented to the hybrid scanner 100 for image capture and processing. An example of an item is a customer identification document, such as a driver's license. The handheld scanner 110 captures an image of the license. If the license includes bar coded information, the information is retrieved from the image. The information may include age information that can be used to determine if the customer can purchase age-restricted products such as beer or wine. The customer presents the identification document to the hybrid scanner 100 by holding the document in the depicted area 350. In some embodiments, the area 350 includes a shelf with markings to identify the area 350.

In addition to documents, a customer can also present small items for purchase by placing them in the area 350. For example, a pack of gum for purchase is placed in the area 350 with the bar code facing the hybrid scanner 100. An image of the pack of gum with its bar code follows the image path 330 to the mirror 305 and is then directed to the handheld scanner 110 where the image is captured and the bar code is read. The item will then be added to the purchase transaction.

In other embodiments, the optical assembly 245 moves the mirror 305 to a third position (not shown). In this position, images of the customer's face are directed to the handheld scanner 110 for capture and storage. These images can also be processed to identify the customer.

The operator can direct the hybrid scanner 100 to move the mirror 305 to the second position 370 (depicted in FIG. 3B) by pressing the first button 125. When the processor 210 detects that the first button 125 has been pressed, it commands the optical assembly 245 to move the mirror 305 to the second position 375 where it receives images from the customer facing window 300.

As depicted in this embodiment, the handheld scanner 110 receives images from the first image path 310 through the bottom of the handheld scanner 110. In other embodiments, the handheld scanner 110 receives images through a different surface and the optical assembly 245 directs images to the image capture device 360 using different image paths.

Some items available for purchase can not easily be presented to the operator side of the hybrid scanner 100 for scanning of a bar code. The items maybe too large, too heavy, fragile or just too inconvenient to move. In these cases, the operator determines that the customer should use the handheld scanner 110 to scan the one or more items. To release the handheld scanner 110 from the cradle 315, the operator presses the second button 140. When the processor 210 detects that the second button 140 has been pressed, it commands the solenoid 260 to retract the pin 340 and release the handheld scanner 110. The customer then removes the handheld scanner 110 from the cradle 315 and scans the item by bring the handheld scanner 110 close to and pointing it at a bar code on the item. The handheld scanner 110 then captures an image of the bar code and processes the image to read the bar code. In some embodiments, the image is processed within the handheld scanner 110. In other embodiments, the image is transmitted to the processor 210 for processing.

Figure 4:
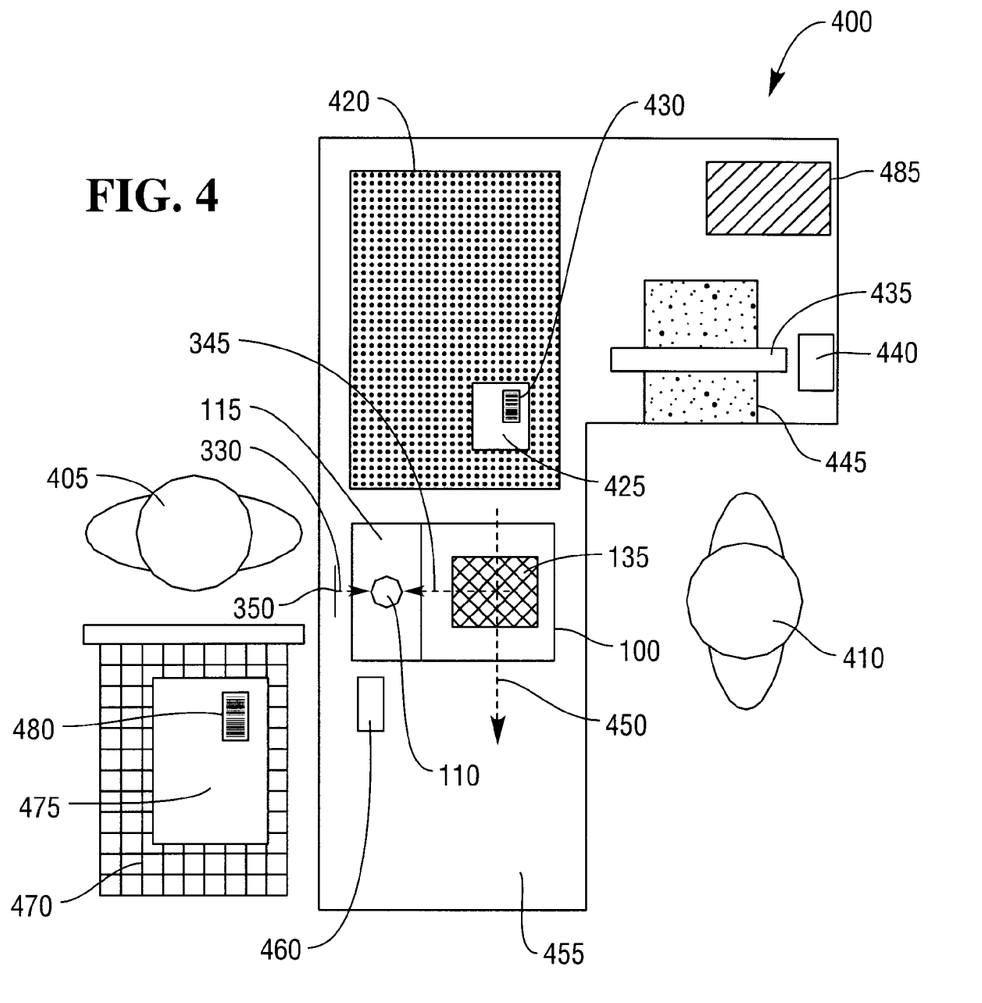
FIG. 4 is a high-level drawing illustrating an exemplar embodiment of a POS terminal including a hybrid scanner.

Turning to FIG. 4, there is provided a high-level drawing illustrating an exemplar embodiment of a POS terminal 400.

The POS terminal 400 includes the hybrid scanner 100, an operator display 435, a printer 440, a feed belt 420, a magnetic stripe reader and pin pad 460, a cash drawer 445, a computer 485 and a bagging area 455. The patterns depicted in the horizontal scanner window 135 represent a laser beam, generated by the laser diode 225, being directed through the window 135 to scan the space above the window 135 for a bar code. The computer 485 controls or operates all the elements of the POS terminal 400 and communicates with a store server (not shown).

In this example, an operator 410 is operating the POS terminal 400 and assisting a customer 405 by processing a purchase transaction. The customer 405 placed an item 425 for purchase on the feed belt 420. The operator 410 picks up the item 425 and moves it in a path 450 past the hybrid scanner 100 so the bar code 430 is facing the operator facing side of the hybrid scanner 100. The optical assembly 245 has placed the mirror 305 in the first position 370 and image of the bar code 430 is directed to the handheld scanner 110 where it is captured and processed to read the bar code 430. In addition, a laser beam from the bi-optic scanner 105 is directed across the bar code 430 and data from the reflected light is captured and processed to also read the bar code 430. In this example, the bar code 430 is successfully read by both the bi-optic scanner 105 and the handheld scanner 110. However, in some cases only one of the scanners will successfully read a bar code. As long as one scanner can read the bar code, the item will be successfully processed as part of the purchase transaction.

The customer 405 also has a large item 475 in a shopping cart 470. The operator 410 presses the second button 140 which causes the handheld scanner 110 to be released. The customer 405 retrieves the handheld scanner 110 from the cradle 315 and aims it at a bar code 480 on the large item 475. The handheld scanner 110 captures an image of the bar code 480 and reads the data associated with the bar code 480. The large item 475 is then added to the purchase transaction. When the handheld scanner 110 is returned to the cradle 315, the processor 210 commands the optical assembly 245 to move the mirror 305 to the first position 370 (depicted in FIG. 3A) and commands the solenoid 260 to lock handheld scanner 110 into the cradle 315. The processor 210 can determine the handheld scanner 110 is in the cradle 315 by checking the status of the battery charger 250.

Figure 5:
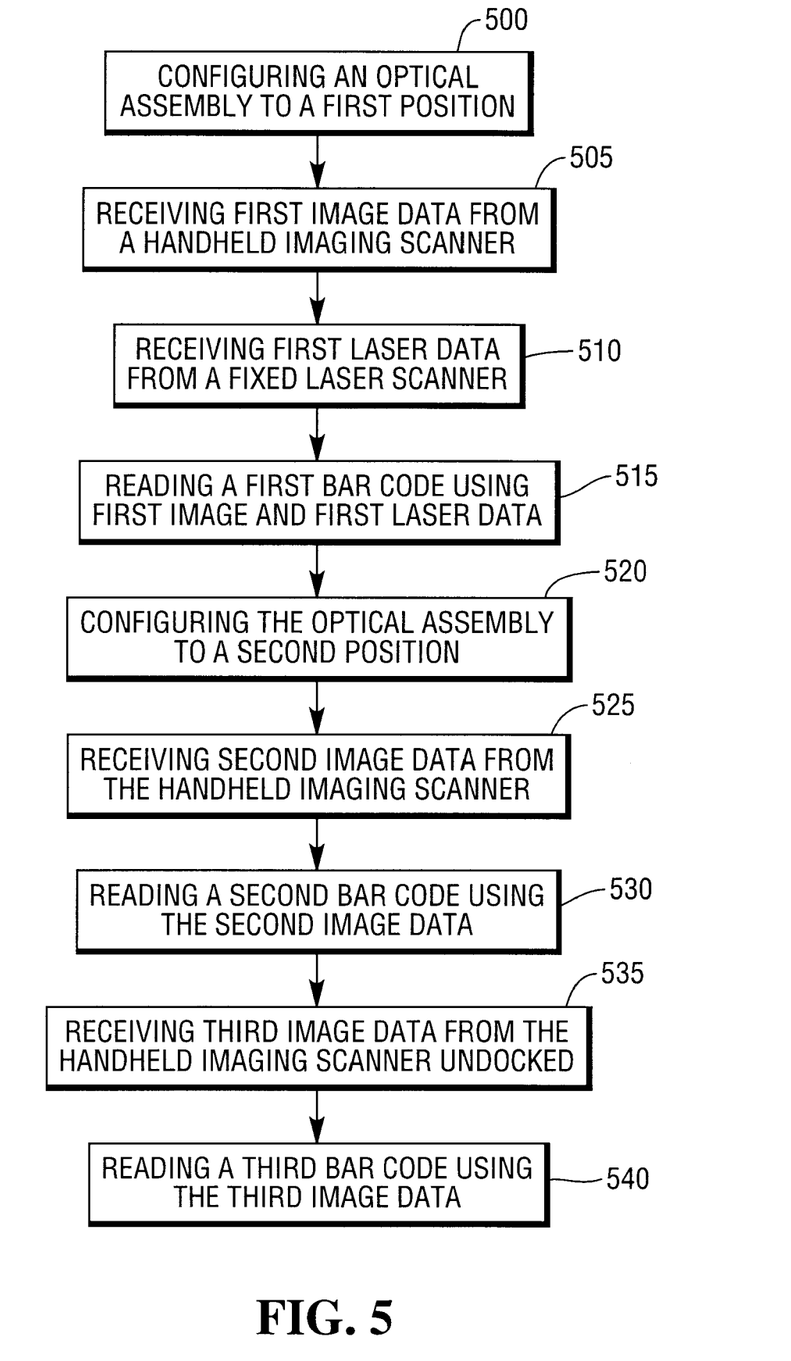
FIG. 5 is a high-level flow chart depicting an exemplary method for operating an assisted hybrid bar code scanner.

FIG. 5 is a high-level flow chart depicting an exemplary method for operating an assisted hybrid bar code scanner (the hybrid scanner). The hybrid scanner 100 includes a handheld imaging scanner (handheld scanner) 110 and a fixed bi-optic laser scanner (the laser scanner) 105. The hybrid scanner 100 uses both the handheld imaging scanner 110 and the laser scanner 105 to read bar codes presented to the operator side of the hybrid scanner 100 and just the handheld imaging scanner 110 to read bar codes or capture images of items presented to the customer side of the hybrid scanner 100. The hybrid scanner 100 uses the handheld imaging scanner 110 to read bar codes on items not directly presented to the hybrid scanner 100 for scanning by releasing the handheld imaging scanner 110 so it can be undocked by a customer and moved to the location of the items for scanning. The scanned items are added to a purchase transaction that is processed by the point of sale terminal 400.

The method starts in step 500 by configuring the optical assembly 245 to a first position 370. In the first position 370, the mirror 305 is moved to the position depicted in FIG. 3A where images from the operator side of the hybrid scanner 100 are directed along the second image path 345 to the handheld scanner 110 for capture. In step 505, the hybrid scanner 100 receives a first image data of a first bar code presented to the operator side of the hybrid scanner 100 from the handheld imaging scanner 110.

In step 510, the hybrid scanner 100 receives first laser data from the fixed laser scanner 105. The laser scanner 105 generates a laser beam and directs it to an area above the horizontal scanner window 135 which is on the operator side of the hybrid scanner 100. The first laser data includes information indicating the amount of laser light reflected from the first bar code as it is presented to the operator side of the hybrid scanner 100 and as the laser beam is moved across the first bar code. The handheld imaging scanner 110 and the laser scanner 105 captures their respective data for the first bar code as the first bar code is moved passed 450 the hybrid scanner 100.

In step 515, the hybrid scanner 100 reads the first bar code by processing and decoding the first image data and first laser data. It is possible to process both the first image data and first laser data and have each data group produce a successful read the first bar code. It is also possible that only one of the data groups will produce a successful read of the first bar code. Only one successfully read is required.

In step 520, the hybrid scanner 100 configures the optical assembly 245 to a second position 375. In the second position, the mirror 305 is moved to the position depicted in FIG. 3B where images from the customer side 320 of the hybrid scanner 100 are directed along the third image path 330 to the handheld scanner 110 for capture.

In step 525, the hybrid scanner 100 receives second image data from the handheld imaging scanner 110. The second image data includes an image of a second bar code which is presented to the location 350 on the customer side of the hybrid scanner 110. In some embodiments, the second bar code is on a document used to identify the customer instead of on an item being presented for purchase. In step 530, the hybrid scanner 100 reads the second bar code by processing and decoding the second image data.

In step 535, the hybrid scanner 100 receives third image data from the handheld imaging scanner 110 after it is undocked from the hybrid scanner 100. Undocking the handheld imaging scanner 110 allows the customer 405 to move the handheld imaging scanner 100 to a location, away from the hybrid scanner 100, and to scan a third bar code (e.g., FIG. 4, 480). In step 540, the hybrid scanner 100 reads the third bar code by processing and decoding the third image data.

Although particular reference has been made to an embodiment that includes a POS terminal and examples have been provided illustrating the invention, certain other embodiments, variations and modifications are also envisioned within the spirit and scope of the following claims. Additionally, the examples using a hybrid bar code scanner can be replaced with a hybrid optical code scanner having the ability to read a wider variety of codes than just bar codes.

We claim:

1. An assisted hybrid bar code scanner where a handheld imaging scanner reads bar codes presented to the hybrid bar code scanner when the handheld imaging scanner is not being used by a customer to read bar codes not presented directly to the hybrid bar code scanner, the hybrid bar code scanner comprising:
   a handheld imaging bar code scanner comprising an image capture device where the image capture device receives images from a first image path; and
   a fixed laser bar code scanner in communication with the handheld scanner, the fixed scanner including:
      an operator facing scanning window through which a laser beam is directed to read bar codes presented to the hybrid bar code scanner for reading;

a customer facing window;

a cradle located on the customer facing side of the hybrid bar code scanner for lockably mounting the handheld scanner in a predetermined orientation; and an optical assembly configurable between a first and a second position where the assembly when in the first position receives a first image from a predetermined second image path that extends through the operator facing scanning window and directs the first image to the handheld scanner along the first image path and when the assembly is in the second position receives a second image from a predetermined third path that extends through the customer facing window and directs the second image to the handheld scanner along the first image path.

2. The hybrid bar code scanner of claim 1, further comprising a first operator input device where activation of the device causes the cradle to unlock and release the handheld imaging scanner when the handheld imaging scanner is locked in the cradle.

3. The hybrid bar code scanner of claim 2, further comprising a second operator input device where activation of the device causes the optical assembly to be configured to the second position.

4. The hybrid bar code scanner of claim 1, wherein the handheld imaging scanner is tethered to the fixed laser bar code scanner and the tether includes wires that provide power and communications between the fixed laser bar code scanner and the handheld imaging scanner.

5. The hybrid bar code scanner of claim 1, wherein the handheld imaging scanner includes a battery and a wireless communications device where the battery powers the handheld imaging scanner and the handheld imaging scanner communicates with the fixed laser bar code scanner using the wireless communications device.

6. The hybrid bar code scanner of claim 5, wherein the cradle include a battery charging device that charges the battery in the handheld imaging scanner when the handheld imaging scanner is locked in the cradle.

7. The hybrid bar code scanner of claim 6, further including a distance detection device where when the handheld imaging scanner is removed from the cradle, the distance detection device determines the distance the handheld imaging scanner is moved from the fixed laser bar code scanner and sounds an alarm when the distance exceeds a predetermined distance.

8. The hybrid bar code scanner of claim 1, wherein the handheld imaging scanner uses the image capture device to capture images where the images include bar codes, coupons, identification documents and faces of customers and where the images are communicated to the laser bar code scanner.

9. The hybrid bar code scanner of claim 8, where the captured images of bar codes include one dimensional and two dimensional bar codes.

10. The hybrid bar code scanner of claim 1, wherein the cradle includes a locking device where when activated the locking device secures the handheld imaging scanner in the cradle in a predetermined position.

11. A method for reading bar codes implemented by a computer in an assisted hybrid bar code scanner, the method comprising:

configuring an optical assembly to a first position that directs images at a handheld imaging bar code scanner from a predetermined first image path that extends through an operator facing scanning window;

receiving first bar code data, captured by the handheld scanner docked to the hybrid bar code scanner, including an image of a first bar code presented to the operator side of the hybrid bar code scanner where optical assembly directs the image to the handheld scanner from the first image path;

receiving second bar code data, collected by a fixed laser scanner, where the data includes information indicating the amount of laser light reflected from the first bar code as the first bar code is presented to the operator side of the hybrid bar code scanner;

reading the first bar code by processing the first and second bar code data;

configuring the optical assembly to a second position that directs images at the handheld imaging bar code scanner from a predetermined second image path that extends through a customer facing scanning window;

receiving third bar code data, captured by the handheld scanner docked to the hybrid bar code scanner, including an image of an item presented to the customer side of the hybrid bar code scanner where optical assembly directs the image to the handheld scanner from the second image path; and receiving fourth bar code data captured by the handheld scanner where the handheld scanner is undocked from the hybrid bar code scanner.

12. The method of claim 11, wherein the item presented to the customer side is a customer identification document.

13. The method of claim 12, wherein the document includes a bar code that includes age information for the customer.

14. The method of claim 11, therein the third image includes an image of a second bar code.

15. The method of claim 11, further comprising receiving a first operator input where the first operator input requests that the optical assembly be configured to the second position.

16. The method of claim 11, further comprising detecting the presence of the handheld scanner and locking the handheld scanner into the hybrid bar code scanner.

17. The method of claim 16, further comprising receiving a second operator input where the second operator input requests unlocking the handheld scanner from the hybrid bar code scanner.

18. An assisted point of sale terminal comprising;

a computer;

a cash drawer;

an operator display; and a hybrid optical code scanner comprising:

a handheld imaging scanner comprising an image capture device where the image capture device receives images from a first image path; and a fixed laser bar code scanner in communication with the handheld imaging scanner, the fixed scanner including:

an operator facing scanning window through which a laser beam is directed to read bar codes presented to the hybrid bar code scanner for reading;

a customer facing window;

a cradle located on the customer facing side of the hybrid optical code scanner for lockably mounting the handheld scanner in a predetermined orientation; and an optical assembly configurable between a first and a second position where the assembly when in the first position receives a first image from a predetermined second image path that extends through the operator facing scanning window and directs the first image to the handheld scanner along the first image path and when the assembly is in the second position receives a second image from a predetermined third path that extends through the customer facing window and directs the second image to the handheld scanner along the first image path.

19. A non-transitory computer readable storage medium including instructions that when executed by a processor in an assisted hybrid scanner cause the processor to:

configure an optical assembly to a first position that directs images at a handheld imaging bar code scanner from a predetermined first image path that extends through an operator facing scanning window;

receive first bar code data, captured by the handheld scanner docked to the hybrid bar code scanner, including an image of a first bar code presented to the operator side of the hybrid bar code scanner where optical assembly directs the image to the handheld scanner from the first image path;

receive second bar code data, collected by a fixed laser scanner, where the data includes information indicating the amount of laser light reflected from the first bar code as the first bar code is presented to the operator side of the hybrid bar code scanner;

read the first bar code by processing the first and second bar code data;

configure the optical assembly to a second position that directs images at the handheld imaging bar code scanner from a predetermined second image path that extends through a customer facing scanning window;

receive third bar code data, captured by the handheld scanner docked to the hybrid bar code scanner, including an image of an item presented to the customer side of the hybrid bar code scanner where optical assembly directs the image to the handheld scanner from the second image path; and receive fourth bar code data captured by the handheld scanner where the handheld scanner is undocked from the hybrid bar code scanner.

* * * * *